United States Patent
Brandl et al.

(10) Patent No.: US 11,566,488 B2
(45) Date of Patent: Jan. 31, 2023

(54) METHOD OF USING DELAYED HYDRATABLE POLYMERIC VISCOSIFYING AGENT IN THE TREATMENT OF A WELL OR SUBTERRANEAN FORMATION

(71) Applicant: Baker Hughes Holdings LLC, Houston, TX (US)

(72) Inventors: Andreas Brandl, Tomball, TX (US); Christina Magelky, Spring, TX (US); Angela Anh Doan, Houston, TX (US); Windal Scott Bray, Cypress, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 17/087,046

(22) Filed: Nov. 2, 2020

(65) Prior Publication Data
US 2021/0148191 A1   May 20, 2021

Related U.S. Application Data

(62) Division of application No. 14/029,520, filed on Sep. 17, 2013, now Pat. No. 10,822,917.

(51) Int. Cl.
| | |
|---|---|
| C09K 8/92 | (2006.01) |
| C09K 8/70 | (2006.01) |
| E21B 33/14 | (2006.01) |
| E21B 43/25 | (2006.01) |
| C09K 8/68 | (2006.01) |
| C09K 8/90 | (2006.01) |
| C09K 8/487 | (2006.01) |
| C04B 28/02 | (2006.01) |
| C09K 8/10 | (2006.01) |
| E21B 33/138 | (2006.01) |

(52) U.S. Cl.
CPC .............. *E21B 33/14* (2013.01); *C04B 28/02* (2013.01); *C09K 8/10* (2013.01); *C09K 8/487* (2013.01); *C09K 8/68* (2013.01); *C09K 8/70* (2013.01); *C09K 8/90* (2013.01); *C09K 8/92* (2013.01); *E21B 33/138* (2013.01); *E21B 43/25* (2013.01)

(58) Field of Classification Search
None
See application file for complete search history.

(56) References Cited

U.S. PATENT DOCUMENTS

| | | | |
|---|---|---|---|
| 5,030,366 A | 7/1991 | Wilson et al. | |
| 5,278,203 A | 1/1994 | Harms | |
| 6,165,947 A * | 12/2000 | Chang | E21B 33/13 507/923 |
| 10,767,098 B2 | 9/2020 | Doan et al. | |
| 11,028,309 B2 | 6/2021 | Doan et al. | |
| 2004/0000893 A1 | 1/2004 | Raichle et al. | |
| 2004/0168804 A1 | 9/2004 | Reddy et al. | |
| 2006/0068994 A1* | 3/2006 | Kesavan | C08B 37/0096 507/110 |
| 2006/0272735 A1* | 12/2006 | Pessin | B65B 37/00 141/69 |
| 2009/0105371 A1 | 4/2009 | Luster-Teasley | |
| 2012/0305250 A1 | 12/2012 | Burts | |
| 2016/0130495 A1 | 5/2016 | Doan et al. | |

OTHER PUBLICATIONS

Gunnar DeBruijn et al.; High-Pressure, High Temperature Technologies, Schlumberger Oilfield Review, Autumn 2008, pp. 46-60.

* cited by examiner

*Primary Examiner* — Andrew Sue-Ako
(74) *Attorney, Agent, or Firm* — John Wilson Jones; Jones Delflache LLP

(57) ABSTRACT

The disclosure relates to a method of delaying viscosification of a well treatment fluid within a well or within a subterranean formation penetrated by a well by introducing into the well a hydratable viscosifying agent of particulates having a minimum of 40% retention on a 60 mesh screen and a minimum of 1% retention on a 20 mesh screen.

20 Claims, No Drawings

METHOD OF USING DELAYED HYDRATABLE POLYMERIC VISCOSIFYING AGENT IN THE TREATMENT OF A WELL OR SUBTERRANEAN FORMATION

This application is a divisional application of U.S. patent application Ser. No. 14/029,520, filed on Sep. 17, 2013.

FIELD OF THE DISCLOSURE

The disclosure relates to a method of delaying viscosification of a well treatment fluid by use of particulates having a minimum of 40% retention on a 60 mesh screen and a minimum of 1% retention on a 20 mesh screen.

BACKGROUND OF THE DISCLOSURE

Aqueous based well treatment fluids are commonly used in the treatment of a well or a subterranean penetration by a well. Such fluids are used, for instance, in drilling, cementing, stimulation, completion and workover operations. Treatment designs typically mandate such fluids to exhibit a certain level of viscosity.

Polymeric viscosifying agents, such as polysaccharides, are often used in such fluids therefore to provide the requisite viscosity. In drilling fluids, such polymers serve to suspend solids and assist in floating debris out of the wellbore. Fracturing fluids typically contain a viscosifying polymer in order to increase the capability of proppant transport into the fracture.

A viscosifying polymer often is present in a fluid to provide the requisite level of viscosity needed to prevent the loss of fluid into the formation. With completion and workover fluids, a viscosifying polymer often functions as a fluid loss pill such that fluid loss is alleviated by the relatively high viscosity that is generated along with any solid material that would be added to deposit onto the formation.

In cementitious slurries, viscosifying polymers are often included in order to control fluid loss and free fluid and to provide stability to the cement. Cellulose-based polymers are most commonly used in cement slurries. Such cellulose-based polymers include hydroxyethyl cellulose (HEC), methylhydroxyethyl cellulose (MHEC), carboxymethylhydroxyethyl cellulose (CMHEC), hydroxyethylmethyl cellulose (HEMC), ethylhydroxyethyl cellulose (EHEC), ethylmethylhydroxyethyl cellulose (EMHEC), hydroxypropyl cellulose (HPC), hydroxyethylpropyl cellulose (HEPC) and carboxymethyl cellulose (CMC). In addition, acrylamidomethylpropane sulfonic acid (AMPS) and derivatives thereof as well as polyvinyl alcohols (PVOHs). AMPS are known to effectuate swelling and cellulose-based polymers are known to control fluid movement by increasing the viscosity of the interstitial water within the hydrating cement particles. In addition, the natural, bonding and ease of homogenization of PVOH assist in keeping the slurry pumpable.

Sometimes, such fluids contain one or more additives to delay the hydration of the polymeric viscosifying agent until increased viscosification of the fluid is needed or to allow viscosity to increase over time. This, in turn, minimizes pumping friction pressure.

For instance, it is common to include a crosslinking delay agent in fracturing fluids to minimize crosslinking of polymeric viscosifying agents until after the fluid passes the pump.

Fluid loss control additives are typically included in drilling, cement slurries, completion fluids and workover fluids to prevent the loss of fluid into highly permeable zones of the subterranean formation or into the wellbore.

For instance, a common problem in well cementing is the loss of liquid fluid from the cementitious slurry into porous low pressure zones in the formation surrounding the well annulus. Polymer hydration typically results from the formation of a sheath of water molecules around the polymeric strand by hydrogen bonding. The high pH environment of cement slurries accelerates hydration. This can negatively affect the mixing of the cement slurry, especially at desired higher loadings of cellulose based polymers.

Fluid loss control additives, including those used in cement slurries, are typically ground into a fine powder as a final stage during their manufacturing process. However, such finely ground powders have a relatively high surface area per weight and quickly hydrate during mixing with water or cement slurries, respectively, resulting instantly in increased viscosity.

Methods have therefore been sought for delaying viscosification of treatment fluids as well as delaying the hydration of polymeric agents until after such fluids have been pumped into the well and the desired effects of such fluids is desired downhole.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

Accordingly, there exists a need for improved methods of delaying hydration of polymeric agents within treatment fluids and delaying of viscosification of treatment fluids as described or shown in, or as may be apparent from, the other portions of this disclosure.

SUMMARY OF THE DISCLOSURE

In an embodiment of the disclosure a method of delaying viscosification of a well treatment fluid within a well or within a subterranean formation is provided by pumping into the well or formation a well treatment fluid containing a hydratable polymeric viscosifying agent comprising particulates having a particle size which maintains a minimum of 40% retention on a 60 mesh screen and a minimum of 1% retention on a 20 mesh screen.

In another embodiment, a method of treating a well or a subterranean formation is provided by pumping into the well or formation a fluid containing a hydratable polymeric viscosifying agent composed of particulates having a particle size which maintains a minimum of 40% retention on a 60 mesh screen and wherein at least one of the following conditions prevails:

(a) the fluid is a fracturing fluid and is pumped into the subterranean formation during a hydraulic fracturing operation;

(b) the fluid is pumped into the subterranean formation during a sand control operation;

(c) the fluid is a drilling fluid and is pumped into the well during a drilling operation; or (d) the fluid is a cementitious slurry and is pumped into the well during a cementing operation and the particle size of the particulates is such that a minimum of 1% of the particulates are retained on a 20 mesh screen.

In another embodiment of the disclosure, a method of delaying viscosification of a well treatment fluid within a well or within a subterranean formation penetrated by a well is disclosed wherein a well treatment fluid is pumped into the well or subterranean formation, the well treatment fluid containing a polymeric hydratable viscosifying agent composed of particulates having a particle size having a minimum of 40% retention on a 60 mesh screen and a minimum of 1% retention on a 20 mesh screen and further wherein the well treatment fluid does not contain the combination of polyvinylpyrrolidone and a condensate of formaldehyde and a sodium salt of a naphthalene sulfonate.

Accordingly, the present disclosure includes methods for delaying hydration or viscosification of treatment fluids within a well or formation. Characteristics and advantages of the present disclosure described above and additional features and benefits will be readily apparent to those skilled in the art upon consideration of the following detailed description of various embodiments and referring to the accompanying drawings.

DETAILED DESCRIPTION OF THE PREFERRED EMBODIMENTS

Characteristics and advantages of the present disclosure and additional features and benefits will be readily apparent to those skilled in the art upon consideration of the following detailed description of exemplary embodiments of the present disclosure and referring to the accompanying FIGURES. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing embodiments in the appended FIGURES, common or similar elements may be referenced with like or identical reference numerals or are apparent from the figures and/or the description herein. The figures are not necessarily to scale and certain features and certain views of the FIGURES may be shown exaggerated in scale or in schematic in the interest of clarity and conciseness.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular elements and materials. As one skilled in the art will appreciate, different persons may refer to an element and material by different names. This document does not intend to distinguish between elements or materials that differ in name. Also, the terms "including" and "comprising" are used herein and in the appended claims in an open-ended fashion, and thus should be interpreted to mean "including, but not limited to . . . " Further, reference herein and in the appended claims to elements and components and aspects in a singular tense does not necessarily limit the present disclosure or appended claims to only one such component, materials or aspect, but should be interpreted generally to mean one or more, as may be suitable and desirable in each particular instance.

The use of the polymeric hydratable viscosifying agent disclosed herein in a well treatment fluid enables pumping of a low viscosity treatment fluid into a well or into a subterranean formation penetrated by the well and providing a more viscous fluid after the fluid is within the well or formation. The delay in hydration of the polymeric hydratable viscosifying agent until after the fluid passes the pump and is within the well minimizes friction pressure placed on the pump.

The polymeric hydratable viscosifying agent is composed of particulates having a minimum of 40% retention on a 60 mesh screen. In an embodiment, the particulates are characterized by a particle size which maintains a minimum of 60% retention on a 60 mesh screen. In another embodiment, the particulates are further characterized as having a minimum of 1% retention on a 20 mesh screen.

When used in cementing, the particulates are further characterized as having a particle size having a minimum of 1% retention, often more than 5% retention, on a 20 mesh screen. Hydration of the viscosifying agent within a cementitious slurry may be delayed until after the slurry is pumped into the well. The presence of the polymeric hydratable viscosifying agent in the slurry provides for the delay in set time until the slurry is placed into its targeted location within the well. In some instances, the set time of the aqueous slurry may be delayed until downhole temperatures as high as 500° F., even as high as 600° F., are obtained.

Loss of fluid from the slurry into low pressure zones in the formation surrounding the annulus is prevented or inhibited by the presence of one or more of the polymeric hydratable viscosifying agents disclosed herein. The polymeric hydratable viscosifying agent(s) provide the requisite level of viscosity needed to prevent the loss of fluid into the formation by delaying the hydration of the slurry until the desired set time.

Hydraulically-active cementitious materials, suitable for use in the cementitious slurry, include materials with hydraulic properties, such as hydraulic cement, slag and blends of hydraulic cement and slag (slagment), which are well known in the art. The term "hydraulic cement" refers to any inorganic cement that hardens or sets due to hydration. As used herein, the term "hydraulically-active" refers to properties of a cementitious material that allow the material to set in a manner like hydraulic cement, either with or without additional activation. Hydraulically-active cementitious materials may also have minor amounts of extenders such as bentonite, gilsonite, and cementitious materials used either without any appreciable sand or aggregate material or admixed with a granular filling material such as sand, ground limestone, the like. Strength enhancers such as silica powder or silica flour can be employed as well. Hydraulic cements, for instance, include Portland cements, aluminous cements, pozzolan cements, fly ash cements, and the like. Thus, for example, any of the oilwell type cements of the class "A-H" as listed in the API Spec 10, (1st ed., 1982), are suitable hydraulic cements. In addition, the cementitious material may include silica sand/flour and/or weighing agents including hematite or barite.

Mixing water is utilized with the dry cement composition to produce a fluid pumpable slurry of suitable consistency. The dry cement mix may contain the polymeric hydratable viscosifying agent (when the polymeric hydratable viscosifying agent is in the form of a non-liquid), cement and other conventional cementing additives like suspending or thixotropic agents, strength retrogression additives, permeability reducers, weighting materials, permeability reducers and anti-settling agents, etc. API Spec 10, Second Edition, June 1984 which is known in the cement industry, describes an approved apparatus and method for measuring the consistency of cement slurries in terms of Bearden units of consistency (Bc). A pumpable slurry should measure in the range from about 2-20 Bc and preferably be in the range from about 5 to 11 Bc. Slurries thinner than about 5 Bc will tend to have greater particle settling and free water generation.

Depending upon the particular slurry and intended conditions of use, mixing water is utilized in the slurry of the present disclosure in the range from about 30 to 150 weight percent based upon the dry weight of cement and preferably is in the range of about 35 to 90 weight percent.

In a typical cementing operation, the cement slurry is pumped down the inside of the pipe or casing and back up the outside of the pipe or casing through the annular space. This seals the subterranean zones in the formation and supports the casing.

The coarser or large particle size of the polymeric hydratable viscosifying agent(s) have a relatively small surface area per weight of the polymer in comparison to the small particle size. This results in longer or delayed complete hydration times during mixing with water or well cement slurries, respectively. The presence of the polymeric hydratable viscosifying agent(s) in the cementitious slurry therefore inhibits the unwanted increase in viscosity of the slurry until the slurry reaches its targeted site and setting of the cement is desired.

Since hydration of the coarse particle size polymeric hydratable viscosifying agents may be time-delayed hydration, surface mixing of the components of the cement mix is facilitated. This ensures at the same time slurry stability under given downhole conditions. Thus, the delayed hydration or viscosification of the greatly facilitates slurry mixing, requires less mixing energy, reduces slurry mixing time and results in a lower or more favorable initial slurry rheology compared to polymeric hydratable viscosifying agent(s) of finer size. In particular, less mixing energy and slurry mixing time and a reduced initial slurry rheology is evidenced by use in the slurry of one or more polymeric hydratable viscosifying agents composed of particulates having a minimum of 40% retention on a 60 mesh screen and a minimum of 1% retention on a 20 mesh screen than a substantially similar slurry differing only by the presence of finer particulates which do not have a minimum of 40% retention on a 60 mesh screen and a minimum of 1% retention on a 20 mesh screen.

Further, the polymeric hydratable viscosifying agents described herein may further be present in the slurry at a higher loading than a substantially similar cement mix containing the finer particulates of the prior art. The ability to provide a higher loading of cement in the slurry minimizes slurry instability which may be caused by thermal thinning of the slurry during its placement into the wellbore at elevated temperatures. Slurry instability may also result in in the formation of free fluid and channeling and cause cement settling and segregation of cement particulates. This may result in the formation of an incomplete cement sheath especially with deviated wells.

In addition, the polymeric hydratable viscosifying agent(s) described herein may be used in other well treatment fluids where delayed hydration of the polymer or viscosification of the treatment fluid is desired. Such polymeric hydratable viscosifying agent(s) may therefore be used in those well treatment fluids for use in stimulation operations such as in hydraulic fracturing or sand control operations. In addition, the fluids may be used in workover fluids, completion fluids and drilling fluids.

The coarse or granular particle sizes of the polymeric hydratable viscosifying agents simplifies their handling in the field compared to the use of fine powders, the latter often resulting in undesired and hazardous dust formation on location.

In a preferred embodiment, the polymeric hydratable viscosifying agent(s) may be used as the viscosifying agent in fracturing fluids in order to carry proppant into a created or enlarged fracture. The fracturing fluid may be injected into a subterranean formation in conjunction with other treatments at pressures sufficiently high enough to cause the formation or enlargement of fractures or to otherwise expose the proppant material to formation closure stress. Such other treatments may be near wellbore in nature (affecting near wellbore regions) and may be directed toward improving wellbore productivity and/or controlling the production of fracture proppant.

A less viscous fluid is desirable since it minimizes friction pressure placed on the pump. The viscosifying agent provided herein enables a low viscosity fluid to be pumped into the formation and a more viscous fluid for proppant transport to be formed after the fluid passes through the pump and is within the well.

One or more of the polymeric hydratable viscosifying agents described herein may also be used in a well treatment fluid, such as a drilling fluid, workover fluid or a completion fluid, to provide the requisite level of viscosity to prevent the loss of fluid into highly permeable zones of the subterranean formation or into the wellbore.

Further, the polymeric hydratable viscosifying agent may be used in a gravel pack operation to prevent or substantially reduce the passage of formation particles into the wellbore. After introduction of a screen assembly into the well, a slurry containing the polymeric hydratable viscosifying agent may be introduced. Viscosification of the fluid is delayed until the fluid is in contact with the screen assembly.

The fluid loss value for a well treatment fluid at a temperature from about 80° F. to about 160° F. containing a polymeric hydratable viscosifying agent composed of particulates having a minimum of 40% retention on a 60 mesh screen has been observed to be lower than a substantially similar fluid containing an polymeric hydratable viscosifying agent composed of particulates having a particle size which maintain less than 20% retention on a 60 mesh screen and, in most cases, less than 10% retention on a 60 mesh screen.

The polymeric hydratable viscosifying agent as disclosed herein may be crosslinkable or non-crosslinkable and may be considered as a thickening polymer which is hydratable to form a linear or crosslinked gel. These include galactomannan gums, guars, derivatized guars, cellulose and cellulose derivatives, starch, starch derivatives, xanthan, derivatized xanthan and mixtures thereof.

Galactomannan gums include underivatized guar, derivatized guars like hydroxypropyl guar (HPG), carboxymethyl hydroxypropyl guar (CMHPG), Celluloses and derivatized celluloses include hydroxyethyl cellulose (HEC), carboxymethyl hydroxyethyl cellulose (CMHEC), carboxymethyl cellulose (CMC), dialkyl carboxymethyl cellulose, methylhydroxyethyl cellulose (MHEC), carboxymethylhydroxy cellulose (CMHC), hydroxyethylmethyl cellulose (HEMC), ethylhydroxyethyl cellulose (EHEC), ethylmethylhydroxyethyl cellulose (EMHEC), hydroxypropyl cellulose (HPC) and hydroxyethylpropyl cellulose (HEPC).

Further examples of polymeric hydratable viscosifying agent(s) also include phosphomannans, scleroglucans, dextrans, starch, starch derivatives, xanthan, derivatized xanthan and mixtures thereof, locust bean gum, welan gum, karaya gum, xanthan gum, diutan, etc.

In addition, polyvinyl alcohols, acrylamidomethylpropane sulfonic acid (AMPS) and salts thereof (especially the alkali metal, like sodium, and ammonium salts) and polyethyleneimines.

In an embodiment, the viscosifying agent comprising the polymeric hydratable viscosifying agent may be adsorbed onto a water-insoluble adsorbent. Suitable water-insoluble adsorbents include minerals, fibers, ground almond shells, ground walnut shells, ground coconut shells, activated carbon, activated coals, silica particulates, precipitated silicas, silica, alumina, silica-alumina, calcium silicate, bauxite, kaolin, talc, zirconia, boron and glass, fly ash, zeolites, diatomaceous earth, ground walnut shells, fuller's earth and organic synthetic high molecular weight water-insoluble adsorbents, and clays and mixtures thereof. The weight ratio of polymeric hydratable viscosifying agent to water-insoluble adsorbent is typically between from about 90:10 to about 10:90. In a particularly preferred embodiment, the viscosifying agent is an ammonium or alkali metal salt of an acrylamidomethylpropanesulfonic acid adsorbed onto a water-insoluble adsorbent.

Typically, the amount of viscosifying polymer employed is between from about 15 to about 50, preferably from about 20 to about 30, pounds per 1,000 gallons of water in the fluid.

Where it is desired for the hydratable polymeric viscosifying agent to form a crosslinked gel, any crosslinking agents suitable for crosslinking the hydratable polymer may be used. Examples of suitable crosslinking agents may include metal ions such as aluminum, antimony, zirconium and titanium-containing compounds, including organotitanates. Examples of suitable crosslinkers may also be found in U.S. Pat. Nos. 5,201,370; 5,514,309, 5,247,995, 5,562,160, and 6,110,875. The crosslinking agent may further be a source of borate ions such as a borate ion donating material. Examples of borate-based crosslinking agents include, but are not limited to, organo-borates, mono-borates, polyborates, mineral borates, etc.

The amount of crosslinking agent present in the aqueous fluid is that amount required to effectuate gelation or viscosification of the fluid at or near the downhole temperature of the targeted area, typically between from about 0.5 gpt to about 5 gpt based on the liquid volume of the aqueous fluid.

The fluid may also include a crosslinking delaying agent in order to allow for an acceptable pump time of the fluid, especially when using less viscous fluids. The use of a crosslinking delaying agent is desirous in order to delay or inhibit the effect of the crosslinking agent present in low pH fluids. The crosslinking delaying agent inhibits crosslinking of the crosslinking agent until after the well treatment fluid is placed at or near the desired location in the wellbore. For instance, it is common to include a crosslinking delay agent in fracturing fluids to minimize crosslinking of polymeric viscosifying agents until after the fluid passes the pump. However, crosslinking delaying agents are normally not required since polymer hydration may be delayed due to the large particle size of the polymeric hydratable viscosifying agent.

The well treatment fluid may further contain a complexing agent, gel breaker, surfactant, biocide, surface tension reducing agent, scale inhibitor, gas hydrate inhibitor, polymer specific enzyme breaker, oxidative breaker, buffer, clay stabilizer, or acid or a mixture thereof and other well treatment additives known in the art. When the fluid is a fracturing fluid, the fluid may contain any conventional proppant.

Further, in light of the effect imparted by the polymeric hydratable viscosifying agents in the prevention or inhibition of fluid loss, it generally is not necessary for the well treatment fluid to contain a fluid loss polymeric hydratable viscosifying agent. Thus, common fluid loss additives, such as polyvinyl pyrrolidone and condensates of formaldehyde and sodium salts of a naphthalene sulfonate as well as combinations thereof need not be present in the fluid.

Since hydration of the coarse particle size polymeric hydratable viscosifying agents may be time-delayed hydration, surface mixing of the components of the cement mix is facilitated. This ensures at the same time slurry stability under given downhole conditions.

EXAMPLES

All percentages set forth in the Examples are given in terms of by weight of cement (BWOC) except as may otherwise be indicated.

Examples 1-4

Slurries were prepared by admixing 50:50 fly ash:Class H, 5% silica, 1% cement extender, 0.5% sodium naphthalene sulfonate dispersant mixture, 6% hydroxyethyl cellulose having a minimum of 40% retention on a 60 mesh screen and a minimum of 1% retention on a 20 mesh screen ("Large") and 6% hydroxyethyl cellulose not having a minimum of 40% retention on a 60 mesh screen and less than 1% retention on a 20 mesh screen ("Regular"). Testing was conducted according to API RP 10B-second edition, April 2013. The experimental conditions and results are tabulated in Table I. Replacing either hydroxyethyl cellulose by their larger particle sized sample lowers the rheological values in comparative slurries.

TABLE I

| Ex. No. | HEC1 | HEC2 | lignosulfonate % BWOC | Temp. ° F. | Rheologies 3/6/100/200/300/200/100/6/3/600 | Fluid Loss | 45° Free Fluid cc's, % |
|---|---|---|---|---|---|---|---|
| 1 | Regular | Regular | 0.3 | ambient | 23/39/230/352/452/369/255/45/30/649 | | |
| | | | | 200 | 43/55/214/298/362/294/212/42/32/522 | 36 | 0 |
| 2 | Large | Large | 0.3 | ambient | 21/18/71/93/99/66/37/6/6/245 @ rt | | |
| | | | | 200 | 38/60/296/406/467/368/254/56/41/512 | 30 | 0 |
| 3 | Large | Regular | 0.1 | ambient | 18/28/158/240/298/243/168/30/20/415 | | |
| | | | | 200 | 52/64/219/308/364/312/207/40/29/509 | 38 | 0 |

TABLE I-continued

| Ex. No. | HEC1 | HEC2 | lignosulfonate % BWOC | Temp. °F. | Rheologies 3/6/100/200/300/200/100/6/3/600 | Fluid Loss | 45° Free Fluid cc's, % |
|---|---|---|---|---|---|---|---|
| 4 | Regular | Large | 0.1 | ambient | 10/15/121/207/277/202/123/15/10/466 | | |
| | | | | 200 | 40/62/283/417/480/381/264/59/44/554 | 34 | 0 |

Examples 5-14

Class H cement, 0.5% of hydroxyethyl cellulose and fresh water were mixed to provide a slurry having a 16.2 ppg density. Testing was conducted according to API RP 10B-2 second edition, April 2013. The experimental conditions and results are tabulated in Table II. Replacing the regular sized hydroxyethyl cellulose additive with the large hydroxyethyl cellulose additive lowered the API Fluid Loss value of comparative slurries over a varying temperature range.

TABLE II

| Ex. No. | HEC1 | Temp °F. | Rheologies 3/6/100/200/300/600 | 45° Free Fluid cc's, % | Fluid Loss |
|---|---|---|---|---|---|
| 5 | Regular | ambient | 19/26/206/346/463/788 | | |
| | | 80 | 18/28/255/425/567/810 | 0 | 70 |
| 6 | Large | ambient | 25/28/179/323/456/608 | | |
| | | 80 | 27/44/341/543/703/849 | 0 | 34 |
| 7 | Regular | ambient | 20/27/221/365/482/760 | | |
| | | 100 | 13/20/195/327/435/682 | 0 | 74 |
| 8 | Large | ambient | 18/19/117/211/300/505 | | |
| | | 100 | 23/35/268/439/580/840 | 0 | 46 |
| 9 | Regular | ambient | 18/25/208/349/463/734 | | |
| | | 120 | 12/18/144/244/328/532 | 0 | 149 |
| 10 | Large | ambient | 23/27/177/310/428/631 | | |
| | | 120 | 23/37/244/387/505/709 | 0 | 74 |
| 11 | Regular | ambient | 16/22/180/308/412/689 | | |
| | | 140 | 14/20/135/221/290/441 | 0 | 224 |
| 12 | Large | ambient | 22/30/139/250/334/472 | | |
| | | 140 | 29/41/254/399/518/643 | 0 | 94 |
| 13 | Regular | ambient | 17/22/137/315/421/697 | | |
| | | 160 | 12/16/121/200/263/389 | 0.3 | 252 |
| 14 | Large | ambient | 19/24/151/263/360/570 | | |
| | | 160 | 26/41/236/368/478/633 | 0 | 134 |

Examples 15-18

Class H cement, 35% of silica sand (Examples 17-18) or a mixture of 17.5% silica flour and 17.5% silica sand (Examples 15-16), 3% of lignosulfonate, hydroxyethyl cellulose, fresh water and optionally modified polynaphthalene sulfonate (PS) dispersant were mixed to provide a slurry having a 16.0 ppg density. Testing was conducted according to API RP 10B-2 second edition, April 2013. The experimental conditions and results are tabulated in Table III which demonstrates that replacing regular sized hydroxyethyl cellulose additive with the large hydroxyethyl cellulose additive lowered the rheological values and API Fluid Loss values of comparative slurries at 300° F.

TABLE III

| Ex. No. | HEC, % | PS, % | Temp., °F. | Rheologies 3/6/100/200/300/600 | 45° Free Fluid cc's, % | Fluid Loss |
|---|---|---|---|---|---|---|
| 15 | Regular, 0.9 | 0.2 | ambient | 41/59/343/545/715/873 | | |
| | | | 300 | | 0 | 58 |
| 16 | Large, 0.9 | 0.2 | ambient | 23/27/114/152/253/415 | | |
| | | | 300 | | 0 | 54 |
| 17 | Regular, 0.6 | — | ambient | 81/132/874+/874+/874+/874+ | | |
| | | | 300 | | 0 | 128 |
| 18 | Large, 0.6 | — | ambient | 57/90/461/662/820/874+ | | |
| | | | 300 | | 0 | 36 |

The methods that may be described above or claimed herein and any other methods which may fall within the scope of the appended claims can be performed in any desired suitable order and are not necessarily limited to any sequence described herein or as may be listed in the appended claims.

What is claimed is:

1. A method of delaying viscosification of a well treatment fluid within a well or within a subterranean formation penetrated by a well, the method comprising introducing into the well or subterranean formation a well treatment fluid containing a crosslinkable hydratable polymeric viscosifying agent and a crosslinking agent or a non-crosslinkable hydratable polymeric viscosifying agent, wherein the hydratable polymeric viscosifying agent comprises particulates having a minimum of 40% retention on a 60 mesh screen and a minimum of 1% retention on a 20 mesh screen and wherein hydration of the hydratable polymeric viscosifying agent is delayed during either (i) stimulation of the well; (ii) a hydraulic fracturing operation of the subterranean formation; (iii) a drilling operation; or (iv) a sand control operation within the well and further wherein a linear gel forms in-situ from the non-crosslinkable polymeric viscosifying agent or a crosslinked gel forms in-situ from the crosslinkable hydratable polymeric viscosifying agent and crosslinking agent.

2. The method of claim 1, wherein the hydratable polymeric viscosifying agent composed of particulates having a particle size which maintain a minimum of 60% retention on a 60 mesh screen.

3. The method of claim 1, wherein the hydratable polymeric viscosifying agent is selected from the group consisting of a cellulosic derivative, a polyvinyl alcohol or an ammonium or alkali metal salt of an acrylamidomethylpropanesulfonic acid and mixtures thereof.

4. The method of claim 3 wherein the hydratable polymeric viscosifying agent is a cellulosic derivative selected from the group consisting of hydroxyethyl cellulose, methylhydroxyethyl cellulose, carboxymethylhydroxyethyl cellulose, hydroxyethylmethyl cellulose, ethylhydroxyethyl cellulose, ethylmethylhydroxyethyl cellulose, hydroxypropyl cellulose, hydroxyethylpropyl cellulose, dialkyl carboxymethyl cellulose, carboxymethylhydroxyethyl cellulose and carboxymethyl cellulose and mixtures thereof.

5. The method of claim 1, wherein the fluid loss value for the well treatment fluid at a temperature from about 80° F. to about 160° F. is lower than a substantially similar fluid containing a hydratable polymeric viscosifying agent composed of particulates having a particle size which maintain less than 20% retention on a 60 mesh screen.

6. The method of claim 1, wherein hydration of the hydratable polymeric viscosifying agent is delayed during stimulation of the well.

7. The method of claim 1, wherein hydration of the hydratable polymeric viscosifying agent is delayed during a hydraulic fracturing operation of the subterranean formation.

8. The method of claim 1, wherein hydration of the hydratable polymeric viscosifying agent is delayed during a drilling operation.

9. The method of claim 1, wherein hydration of the hydratable polymeric viscosifying agent is delayed during a sand control operation within the well.

10. The method of claim 1, wherein the hydratable polymeric viscosifying agent is non-crosslinkable and further wherein a linear gel is formed in-situ from the non-crosslinkable polymeric viscosifying agent.

11. A method of treating a well or a subterranean formation penetrated by a well comprising introducing into the well or subterranean formation a fluid containing a hydratable polymeric viscosifying agent composed of particulates having a particle size such that a minimum of 40% of the particulates are retained on a 60 mesh screen and wherein at least one of the following conditions prevails:
    (a) the fluid is a fracturing fluid and is pumped into the subterranean formation during a hydraulic fracturing operation;
    (b) the fluid is pumped into the subterranean formation during a sand control operation; or
    (c) the fluid is a drilling fluid and is pumped into the well during a drilling operation
and further wherein the hydratable polymeric viscosifying agent, when introduced into the well is (i) a crosslinkable hydratable polymeric viscosifying agent and a crosslinking agent wherein a thickened crosslinked gel forms in-situ; or (ii) a non-crosslinkable hydratable polymeric viscosifying agent which forms in-situ a linear gel.

12. The method of claim 11, wherein the fluid is a fracturing fluid and further wherein the particulates are selected from the group consisting of polyvinyl alcohol, an ammonium or alkali metal salt of an acrylamidomethylpropanesulfonic acid, hydroxyethyl cellulose, methylhydroxyethyl cellulose, carboxymethylhydroxyethyl cellulose, hydroxyethylmethyl cellulose, ethylhydroxyethyl cellulose, ethylmethylhydroxyethyl cellulose, hydroxypropyl cellulose, hydroxyethylpropyl cellulose, dialkyl carboxymethyl cellulose, carboxymethylhydroxyethyl cellulose and carboxymethyl cellulose and mixtures thereof.

13. The method of claim 11, wherein the hydratable polymeric viscosifying agent is composed of particulates having a particle size which maintain a minimum of 50% retention on a 60 mesh screen.

14. The method of claim 13, wherein the hydratable polymeric viscosifying agent is composed of particulates having a particle size which maintain a minimum of 60% retention on a 60 mesh screen.

15. The method of claim 11, wherein the fluid is a fracturing fluid and wherein viscosification of the fracturing fluid within the formation is delayed by the presence of the hydratable polymeric viscosifying agent in the fracturing fluid.

16. The method of claim 11, wherein the fluid is a drilling fluid and wherein viscosification of the drilling fluid during a drilling operation is delayed by the presence of the hydratable viscosifying agent.

17. The method of claim 11, wherein the fluid is a fracturing fluid and pumped into the subterranean formation at a pressure sufficient to initiate or create a fracture and wherein viscosification of the fracturing fluid within the formation is more delayed than when a substantially similar well treatment fluid is pumped into the well, the substantially similar well treatment fluid containing a hydratable polymeric viscosifying agent composed of particulates having a particle size which maintain less than 20% retention on a 60 mesh screen.

18. The method of claim 11, wherein the hydratable polymeric viscosifying agent is composed of particulates having a minimum of 1% retention on a 20 mesh screen.

19. The method of claim 11, wherein the hydratable polymeric viscosifying agent is composed of particulates having more than 5% retention on a 20 mesh screen.

20. A method of delaying hydration or viscosification of a well treatment fluid within a well or within a subterranean formation penetrated by a well, the method comprising introducing into the well or subterranean formation a fracturing fluid containing proppant and a hydratable polymeric viscosifying agent composed of particulates having a particle size having a minimum of 40% retention on a 60 mesh screen and a minimum of 1% retention on a 20 mesh screen and wherein the hydratable polymeric viscosifying agent, when introduced into the well is a crosslinkable hydratable polymeric viscosifying agent and a crosslinking agent or a non-crosslinkable hydratable polymeric viscosifying agent and wherein the hydratable polymeric viscosifying agent carries the proppant into a created or enlarged fracture in the well and further wherein (i) a thickened crosslinked gel forms in-situ from the polymeric viscosifying agent and crosslinking agent or (ii), a linear gel is formed in-situ from the hydratable polymeric viscosifying agent.

* * * * *